United States Patent
Asahara et al.

(10) Patent No.: US 9,239,580 B2
(45) Date of Patent: Jan. 19, 2016

(54) AUTONOMOUS MOBILE ROBOT, SELF POSITION ESTIMATION METHOD, ENVIRONMENTAL MAP GENERATION METHOD, ENVIRONMENTAL MAP GENERATION APPARATUS, AND DATA STRUCTURE FOR ENVIRONMENTAL MAP

(75) Inventors: Yoshiaki Asahara, Obu (JP); Kazuhiro Mima, Toyota (JP); Hidenori Yabushita, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 273 days.

(21) Appl. No.: 12/919,354

(22) PCT Filed: Jan. 26, 2009

(86) PCT No.: PCT/JP2009/051200
§ 371 (c)(1),
(2), (4) Date: Aug. 25, 2010

(87) PCT Pub. No.: WO2009/107430
PCT Pub. Date: Sep. 3, 2009

(65) Prior Publication Data
US 2011/0010033 A1  Jan. 13, 2011

(30) Foreign Application Priority Data
Feb. 26, 2008  (JP) .................................. 2008-044058

(51) Int. Cl.
*G05D 1/02* (2006.01)

(52) U.S. Cl.
CPC .............. *G05D 1/0274* (2013.01); *G05D 1/024* (2013.01); *G05D 1/0231* (2013.01); *G05D 1/0242* (2013.01); *G05D 1/0251* (2013.01); *G05D 1/0255* (2013.01)

(58) Field of Classification Search
CPC ... G05D 1/024; G05D 1/0274; G05D 1/0231; G05D 1/0255; G05D 1/0242
USPC ............ 318/587; 700/245, 253, 258; 701/23, 701/25, 26, 28; 901/1, 46; 919/587
See application file for complete search history.

(56) References Cited

U.S. PATENT DOCUMENTS

| 5,006,988 A | * | 4/1991 | Borenstein ........... G05D 1/0255 180/169 |
| 5,677,836 A | * | 10/1997 | Bauer ................. A47L 11/4011 701/23 |

(Continued)

FOREIGN PATENT DOCUMENTS

| JP | 62-058311 A | 3/1987 |
| JP | 2001-125640 A | 5/2001 |

(Continued)

OTHER PUBLICATIONS

F. Lu et al.: Globally Consistent Range Scan Alignment for Environment Mapping, Autonomous Robots, Kluwer Academic Publishers, Dordrecht, NL, vol. 4, No. 4, 1997, pp. 333-349.

(Continued)

*Primary Examiner* — Stephen Holwerda
(74) *Attorney, Agent, or Firm* — Kenyon & Kenyon LLP

(57) ABSTRACT

To improve the accuracy of the self position estimation of a mobile robot. A robot measures a distance to an object in the mobile environment by using a range sensor. An environmental map storage unit stores an environmental map containing a plurality of map data each corresponding to a respective one of a plurality of measurement directions from which a point in the mobile environment is to be observed. A self position estimation unit selects a map data corresponding to a measurement direction in which a distance to the object is measured by the range sensor from the plurality of map data. Then, the self position estimation unit estimates a self position of the mobile robot based on the selected map data and range data obtained by the range sensor.

6 Claims, 14 Drawing Sheets

(56) References Cited

U.S. PATENT DOCUMENTS

| | | | |
|---|---|---|---|
| 2005/0187678 A1* | 8/2005 | Myeong | G05D 1/0255 701/27 |
| 2005/0213082 A1* | 9/2005 | DiBernardo | G01S 5/163 356/139.03 |
| 2006/0058921 A1* | 3/2006 | Okamoto | G05D 1/0214 700/255 |
| 2007/0058838 A1* | 3/2007 | Taniguchi | G06K 9/00664 382/103 |

FOREIGN PATENT DOCUMENTS

| | | |
|---|---|---|
| JP | 2001-242934 A | 9/2001 |
| JP | 2005-310043 A | 11/2005 |
| JP | 2006-252346 A | 9/2006 |
| JP | 2007-078476 A | 3/2007 |
| JP | 2008-276754 A | 11/2008 |

OTHER PUBLICATIONS

Hanna Bulata et al.: "Incremental Construction of a Landmark-based and Topological Model of Indoor Environments by a Mobile Robot", Robotics and Automation 1996, vol. 2, 1996, pp. 1054-1060.

Supplementary European Search Report of EP 09 71 3949 issued Nov. 7, 2011.

Office Action of Japanese priority application No. JP 2008-044058 drafted Dec. 9, 2010 and partial English translation thereof.

* cited by examiner

Fig. 8B    200R:-x DIRECTION WALL MAP
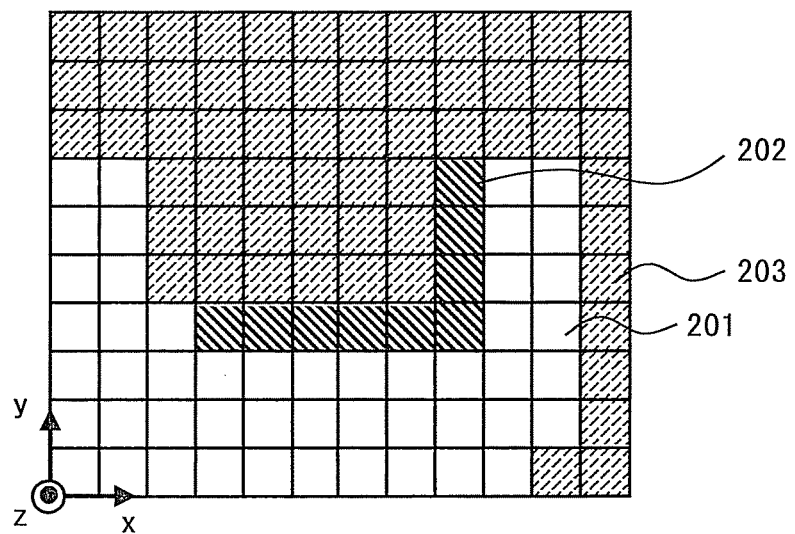
Fig. 8C    200D: +y DIRECTION WALL MAP
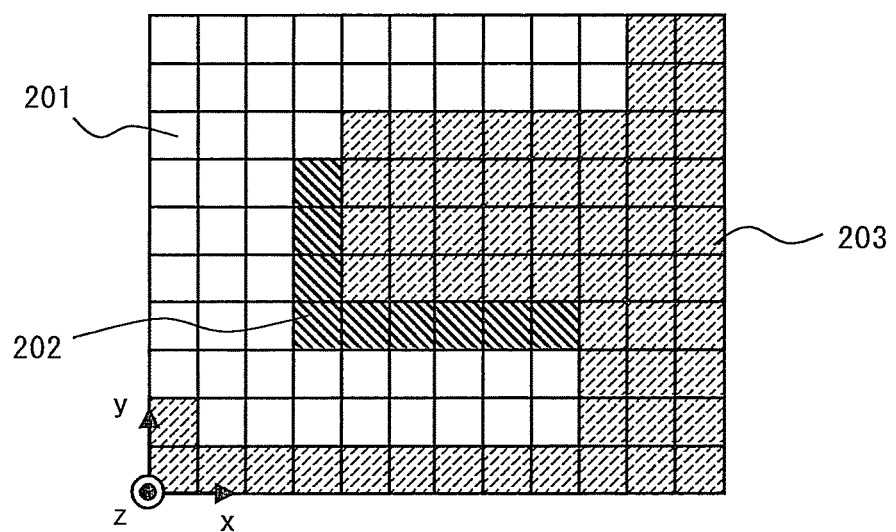

Fig. 8D  200L:+x DIRECTION WALL MAP
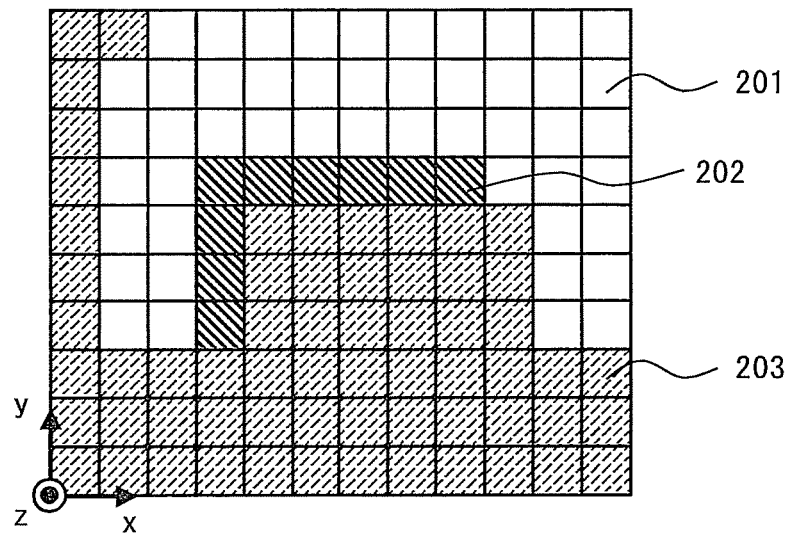
Fig. 9A  41:WALL MAP
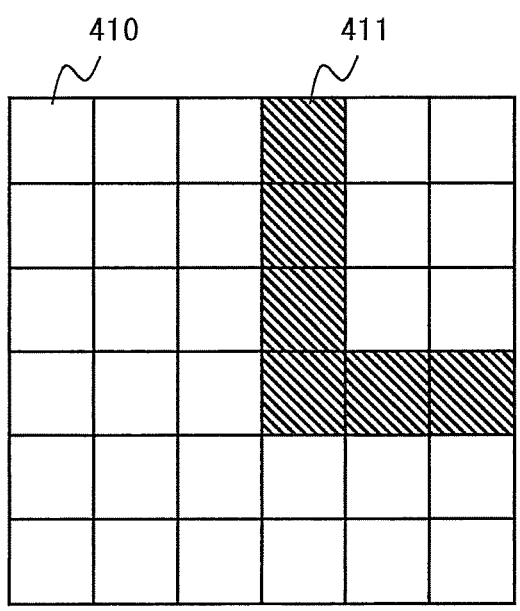

Fig. 9B   42:RANGE MAP

| 3 | 2 | 1 | 0 | 1 | 2 |
|---|---|---|---|---|---|
| 3 | 2 | 1 | 0 | 1 | 2 |
| 3 | 2 | 1 | 0 | 1 | 1 |
| 3 | 2 | 1 | 0 | 0 | 0 |
| 3.2 | 2.2 | 1.4 | 1 | 1 | 1 |
| 3.9 | 2.8 | 2.4 | 2 | 2 | 2 |

US 9,239,580 B2

AUTONOMOUS MOBILE ROBOT, SELF POSITION ESTIMATION METHOD, ENVIRONMENTAL MAP GENERATION METHOD, ENVIRONMENTAL MAP GENERATION APPARATUS, AND DATA STRUCTURE FOR ENVIRONMENTAL MAP

This is a 371 national phase application of PCT/JP2009/051200 filed 26 Jan. 2009, claiming priority to Japanese Patent Application No. JP 2008-044058 filed 26 Feb. 2008, the contents of which are incorporated herein by reference.

TECHNICAL FIELD

The present invention relates to an autonomous mobile robot, in particular a self position estimation technique and an environmental map generation technique for an autonomous mobile robot.

BACKGROUND ART

Environmental maps describing the mobile environment of autonomous mobile robots (hereinafter, simply called "mobile robots") may be used in the mobile robots for their autonomous movements (see Patent documents 1-3). Such environmental maps are used for estimating for the self position of mobile robots in mobile environment and for planning of moving paths and the likes. For example, the environmental map is generated as a grid map, in which two-dimensional (2D) mobile environment, where the mobile robot moves, is divided in a grid pattern, and an indication to indicate whether or not the mobile robot can move is arranged in each grid cell framed in by grid lines.

The generation of environmental maps are implemented, for example, by measuring the mobile environment using a range sensor capable of obtaining range information of the outside world, such as a laser range finder and a stereo camera (see Patent documents 1, 3 and 4). The environmental maps may be generated in advance and then supplied to mobile robots, or may be generated by the mobile robots having range sensors in their own while moving in the mobile space. The latter technique in which the estimation of the self position of the mobile robot and the generation of the environmental map are performed simultaneously is called "SLAM (Simultaneous Localization and Mapping)".

For example, a mobile robot disclosed in Patent document 1 is equipped with plural range sensors adopting different sensing principles, e.g., an ultrasonic sensor and an infrared sensor, and measures plural spatial areas located at different heights from the floor surface on which the mobile robot is located by using these range sensors. Then, the mobile robot disclosed in Patent document 1 generates plural 2D environmental maps based on range data obtained by the range sensors, and generates a single 2D environmental map by superimposing and integrating these plural 2D environmental maps. The mobile robot disclosed in Patent document 1 searches an optimal moving path that can avoid an obstacle by referring to the integrated 2D environmental map, and performs movement while avoiding the obstacle.

Furthermore, Patent document 2 discloses an environmental map for a mobile robot in which 2D mobile space is divided into unit areas. Then, with the environmental map being defined as an xy-plane, x-direction and y-direction distances from each unit area to an obstacle are recorded as information for each unit area. The mobile robot disclosed in Patent document 2 estimates the self position in the mobile environment by comparing a distance to an obstacle measured by a range finder with a distance to the obstacle recorded in that environmental map.

Furthermore, Patent documents 3 and 4 disclose techniques to generate environmental maps for mobile robots in which positions of obstacles are identified as 2D grid maps. Specifically, the mobile robots disclosed in Patent documents 3 and 4 measure mobile environment by a range sensor installed in the mobile robot, and project the position of an obstacle calculated by using the measured range information on a 2D grid map. When cells for which the number of times an obstacle is projected exceeds a predefined value, the cells are determined as "obstacle cells" in which an obstacle exists and an environmental map in which the positions of obstacles are specified is created.

[Patent Document 1]
Japanese Unexamined Patent Application Publication No. 2005-310043
[Patent Document 2]
Japanese Unexamined Patent Application Publication No. 62-58311
[Patent Document 3]
Japanese Unexamined Patent Application Publication No. 2006-252346
[Patent Document 4]
Japanese Unexamined Patent Application Publication No. 2001-242934

DISCLOSURE OF INVENTION

Technical Problems

The environmental maps disclosed in the above-described Patent documents 1, 3 and 4 are generated by using measurement results obtained by range sensors installed in the mobile robots, such as a laser range finder, an ultrasonic sensor, and an infrared sensors. However, the environmental maps disclosed in these Patent documents 1, 3 and 4 as well as Patent document 2 do not have any information about a measurement direction, i.e., information about which direction a laser, a light beam, or a sound wave or the like is radiated from for the measurement. Consequently, there has been a problem that the self position estimation of a mobile robot cannot be performed with accuracy.

As shown in FIG. 13A, assume an example where a mobile robot 80 equipped with a laser range finder obtains a group of measured points 81 by radiating a laser, and estimates the self position by comparison between the group of measured points 81 and an environmental map. FIG. 13B shows an example of an environmental map 800 possessed by the mobile robot 80. The environmental map 800 is created as a 2D grid map. Each grid cell constituting the environmental map 800 retains at least information indicating whether or not the mobile robot 80 can move to that grid cell. In the following explanation, cells to which the mobile robot 80 can move are called "movable cell", and cells to which it cannot move are called "wall cells". In FIG. 13B, outlined cells represent "movable cells" and hatched cells represent "wall cells".

When the mobile robot 80 performs matching between the measured point group 81 shown in FIG. 13A and the environmental map 800, the measured point group 81 can correspond to either a wall 801 or a wall 802 in the environmental map 800. Consequently, two points A and B in FIG. 13B can both become candidates for the self position of the mobile robot 80, and therefore the mobile robot 80 could not perform accurate self position estimation.

Note that Patent documents 3 and 4 create an environmental map by integrating plural results each of which is obtained by measuring the same point in the mobile environment from a different robot location. However, Patent documents 3 and 4 simply count the number of times an obstacle is determined to exist by carrying out plural measurements. That is, when the place is measured, any information about "a measurement direction" i.e., information about which direction a laser, a light beam, or a sound wave or the like is radiated from is not reflected on the environmental map.

Furthermore, although Patent document 1 creates plural environmental maps of areas located at different heights by plural range sensors, they are integrated with each other to create a single 2D environmental map in a subsequent step. Therefore, the environmental map that is used for the self potion estimation of the mobile robot contains neither information about which of measurement results of the plural sensors is used to create the environmental map nor information about "a measurement direction" i.e., information about which direction a laser, a light beam, or a sound wave or the like is radiated from.

Technical Solution

A first aspect of the present invention is a mobile robot that moves in mobile environment. The mobile robot includes a range sensor, an environmental map storage unit, and a self position estimation unit. The range sensor measures a distance to an object in the mobile environment. The environmental map storage unit stores an environmental map containing a plurality of map data each corresponding to a respective one of plurality of measurement directions from which a point in the mobile environment is to be observed. The self position estimation unit selects a map data corresponding to a measurement direction in which the object is measured by the range sensor from the plurality of map data, and estimates a self position of the mobile robot based on the selected map data and range information of the object obtained by the range sensor.

A second aspect of the present invention is a method of estimating a self position of a mobile robot that moves in mobile environment, the method including:

a step (a) for measuring a distance to an object in the mobile environment;

a step (b) for referring to an environmental map containing a plurality of map data each corresponding to a respective one of plurality of measurement directions from which a point in the mobile environment is to be observed;

a step (c) for selecting a map data corresponding to a measurement direction in which range measurement for the object is carried out from the plurality of map data; and a step (d) for estimating a self position of the mobile robot based on the selected map data and range information of the object.

A third aspect of the present invention is a method of generating an environmental map in regard to mobile environment of a mobile robot, the method including:

a step (e) for measuring a point in the mobile environment from a plurality of measurement directions;

a step (f) for generating a plurality of map data in regard to the point, each of the plurality of map data being generated for a respective one of the plurality of measurement directions based on a measurement result for the respective one of the plurality of measurement directions; and a step (g) for associating coordinate information to specify a position of the point with the plurality of map data and storing them.

A fourth aspect of the present invention is an apparatus that generates an environmental map in regard to mobile environment of a mobile robot, including: (1) means to input measurement results of a point in the mobile environment, the measurement results being obtained by measuring the point from a plurality of measurement directions; (2) means to generate a plurality of map data in regard to the point, each of the plurality of map data being generated for a respective one of the plurality of measurement directions based on a measurement result for the respective one of the plurality of measurement directions; and (3) means to associate coordinate information to specify a position of the point with the plurality of map data and store them.

A fifth aspect of the present invention is a data structure for an environmental map. The data structure includes coordinate information to specify a position of a mobile robot in mobile environment, and map data of a point observed from a first measurement direction and map data of the point observed from a second measurement direction different from the first measurement direction, the point being specified by the coordinate information.

Advantageous Effects

The above-described first to fifth aspects of the present invention include an environmental map containing a plurality of map data each corresponding to a respective one of plurality of measurement directions from which a point in the mobile environment is to be observed. When a mobile robot performs self position estimation, different map data may be used depending on the measurement direction in which measurement is carried out by a range sensor. In this way, the self position estimation can be performed by using optimal map data corresponding to the view of the surroundings from the position of the mobile robot. Consequently, errors in self position estimation, which would be otherwise caused by a fact that the matching is performed between a measurement result obtained by a range sensor and a wall that is invisible from the position of a mobile robot, can be prevented, and thus improving accuracy of the self position estimation.

BRIEF DESCRIPTION OF DRAWINGS

FIG. 8B shows an example of a wall map retaining map data for each measurement direction;

FIG. 8C shows an example of a wall map retaining map data for each measurement direction;

FIG. 8D shows an example of a wall map retaining map data for each measurement direction;

FIG. 9A shows an example of a range map;

FIG. 9B shows an example of a range map;

EXPLANATION OF REFERENCE

1 MOBILE ROBOT
11 RANGE SENSOR
12 MAP GENERATION UNIT
13 ENVIRONMENTAL MAP STORAGE UNIT
14 SELF POSITION ESTIMATION UNIT
15 AUTONOMOUS MOVEMENT UNIT

BEST MODES FOR CARRYING OUT THE INVENTION

Specific exemplary embodiments to which the present invention is applied are explained hereinafter in detail with reference to the drawings. The same signs are assigned to the same components throughout the drawings, and duplicated explanation is omitted as appropriate for clarifying the explanation.

First Exemplary Embodiment

Figure 1:
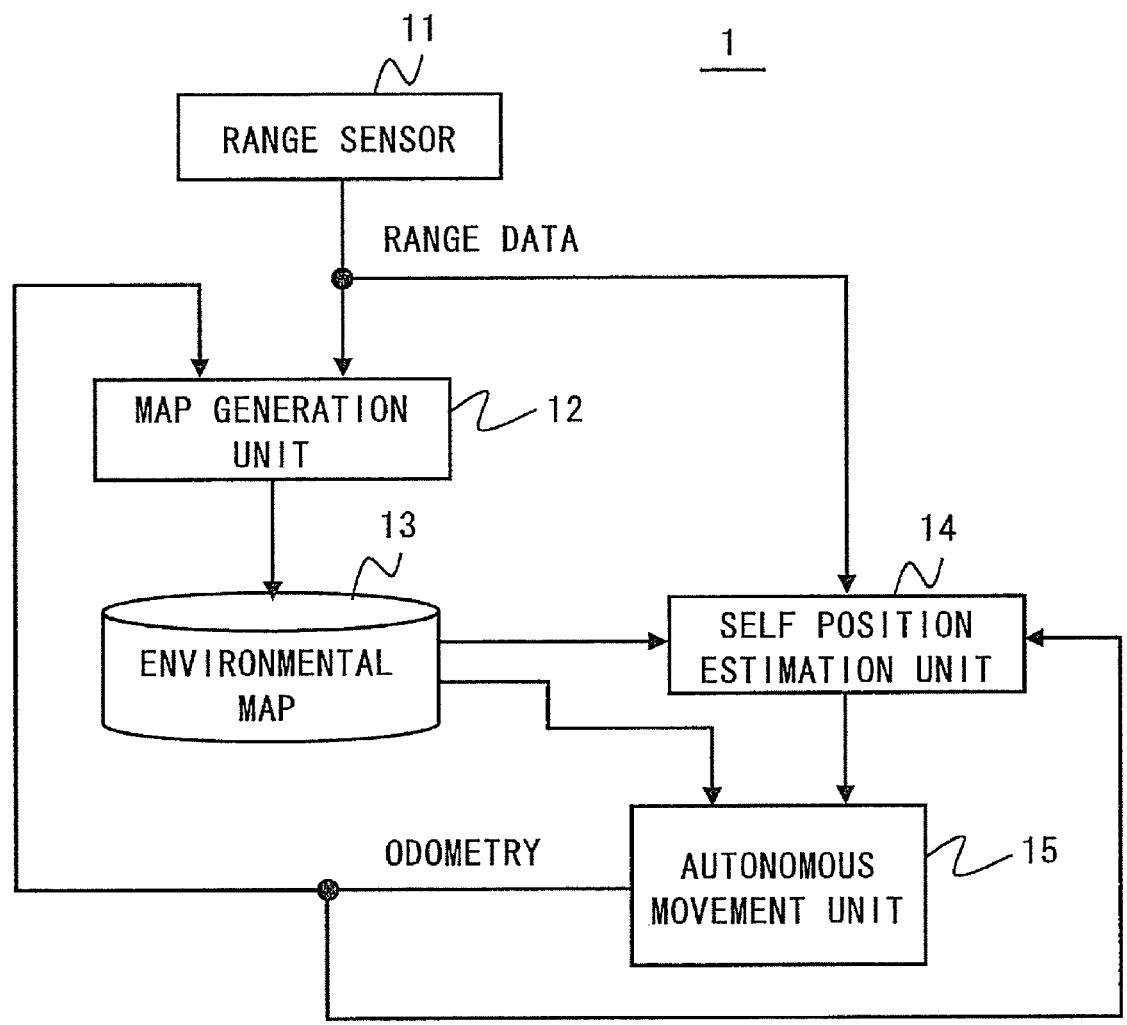
FIG. 1 is a block diagram illustrating a control system of a mobile robot in accordance with a first exemplary embodiment of the present invention.

FIG. 1 shows a configuration of a control system relating to autonomous movement of a mobile robot 1 (hereinafter, simply called "robot 1") in accordance with this exemplary embodiment of the present invention. In FIG. 1, a range sensor 11 measures a distance to an object existing within the mobile environment of the robot 1. Specifically, the range data may be obtained by an active range sensor such as a laser range finder and an ultrasonic sensor. Furthermore, the range sensor 11 may be a sensor that performs range measurement by obtaining parallax images with a stereo camera. It should be noted that the following explanation for this exemplary embodiment of the present invention is made on the assumption that the range sensor 11 is a laser range finder.

A map generation unit 12 generates an environmental map in regard to mobile space, within which the mobile robot 1 moves, by using range data obtained by the range sensor 11. The environmental map generated by the map generation unit 12 is stored in an environmental map storage unit 13. In this exemplary embodiment, the environmental map is created as a grid map obtained by dividing the mobile space in 2D (two-dimensional) grid pattern. Each grid cell constituting the environmental map retains at least information indicating whether or not the mobile robot 1 can move to that grid cell. In the following explanation, cells to which the mobile robot 1 can move are called "movable cells", and cells to which it cannot move are called "wall cells". Note that the non-movable cells may be further divided. For example, non-movable cells located on the opposite side of an obstacle with respect to the mobile robot 1 and not observed from the mobile robot 1 may be referred to as "unobserved cells", and non-movable cells that were already observed are referred to as "wall cells".

Furthermore, in order to take into consideration the fact that the view of an object existing in the mobile environment is changed depending on the location of the mobile robot 1, an environmental map in accordance with this exemplary embodiment of the present invention retains a plurality of map data corresponding to a plurality of measurement directions for a single grid cell in the grid map. Specific examples of the environmental map and its generation procedure will be explained later.

A self position estimation unit 14 estimates the absolute position of the mobile robot 1 in the mobile environment by using the range data obtained by the range sensor 11 as well as odometry information and the environmental map. Specific examples of the self position estimation unit 14 and its self position estimation procedure will be explained later.

Figure 2:
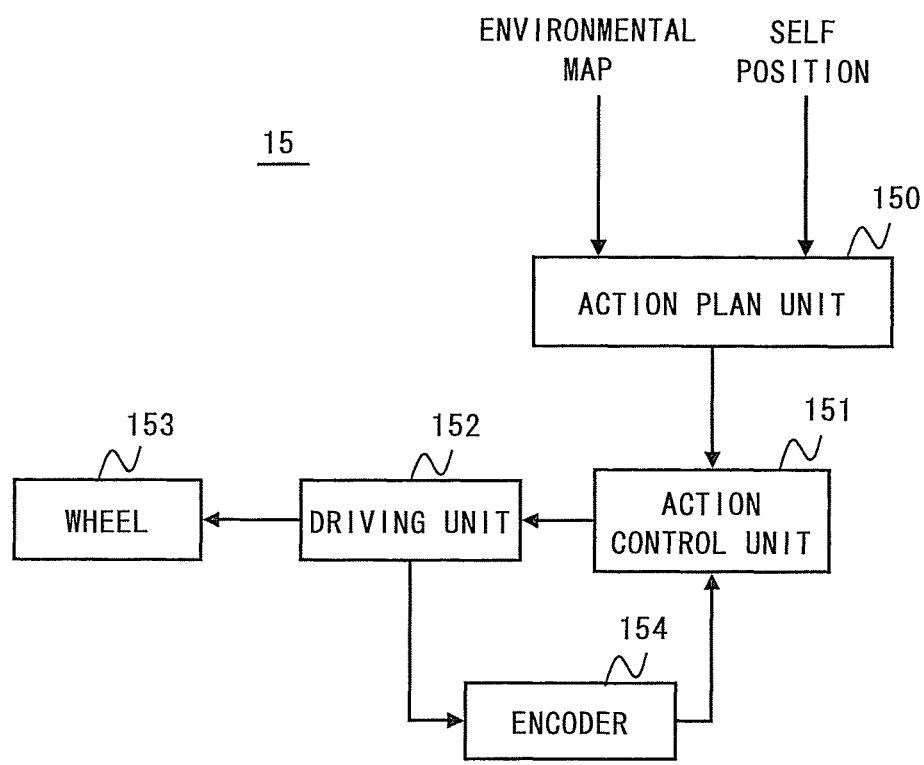
FIG. 2 is a block diagram of an autonomous movement unit.

An autonomous movement unit 15 refers to an environmental map stored in the environmental map storage unit 13, and performs autonomous movement control. FIG. 2 is a block diagram illustrating an example of an autonomous movement unit 15 in a case where the mobile robot 1 is a wheel-traveling-type robot. Needless to say, the mobile robot 1 may be any mobile robot other than the wheel-traveling-type robot, such as a leg-walking-type robot.

In FIG. 2, an action planning unit 150 determines the action of the mobile robot 1 based on an environmental map and the self position information of the mobile robot 1 determined by the self position estimation unit 14 and the like. More specifically, the action planning unit 150 determines a moving path, a target moving speed, and a target acceleration of the mobile robot 1, and a target angular track of a joint (not shown) provided in the mobile robot 1 and the like.

An action control unit 151 receives a target control value such as a target moving speed or a target acceleration determined by the action planning unit 150, and a rotation amount of a wheel 153 measured by an encoder 154, and performs feedback control in order to calculate a torque control value to rotationally drive the wheel 153. A driving unit 152 drives the wheel 153 according to a torque value calculated by the action control unit 151, so that the mobile robot 1 moves.

Figure 3:
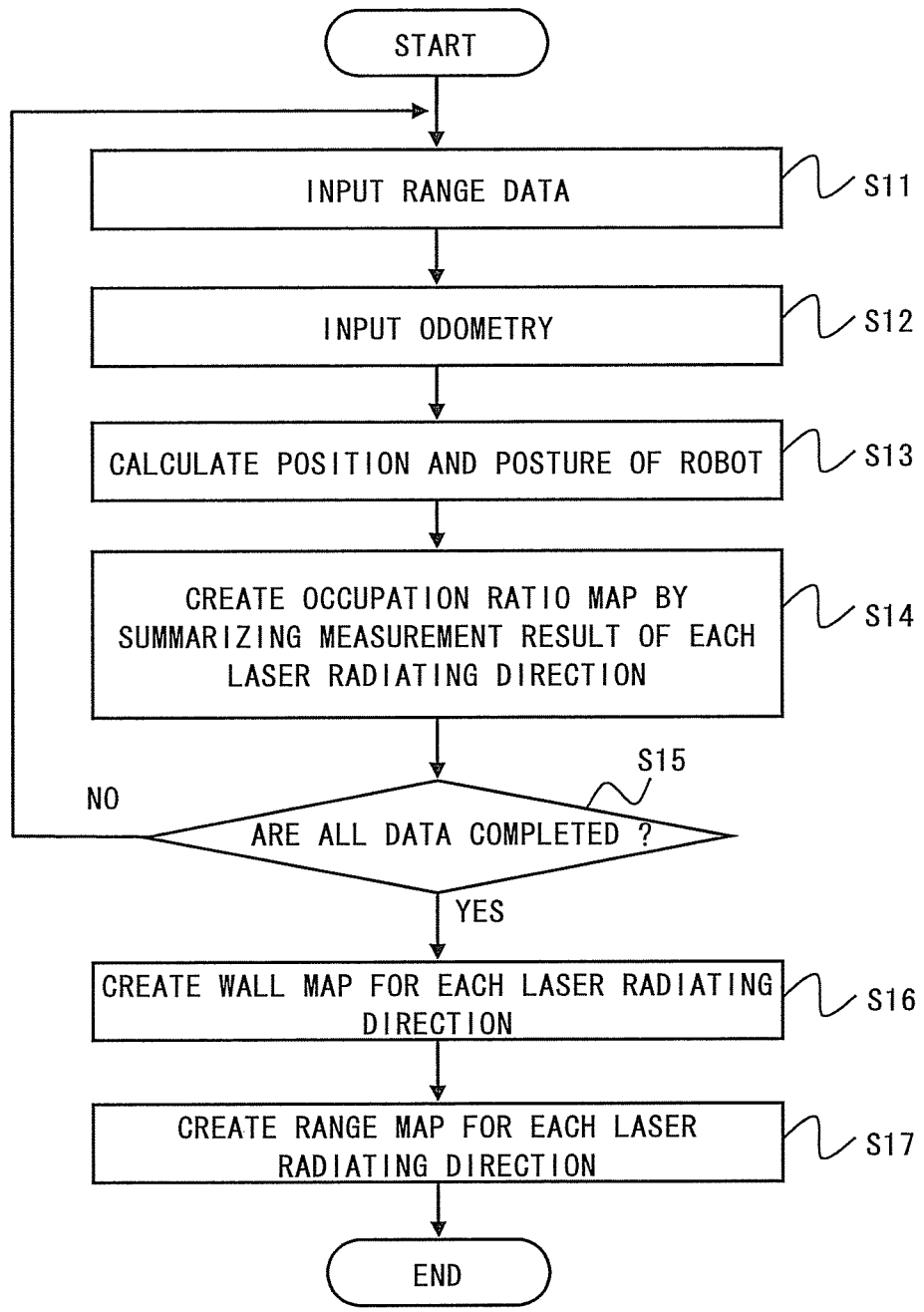
FIG. 3 is a flowchart showing an example of procedure for generating an environmental map.

Next, specific examples of generation procedure of an environmental map as well as the environmental map itself are explained hereinafter in detail with reference to FIGS. 3 to 10. FIG. 3 is a flowchart showing generation procedure of an environmental map by the map generation unit 12. In a step S11, the map generation unit 12 receives range data obtained by the range sensor 11. In a step S12, the map generation unit 12 receives odometry information obtained by the encoder 154.

In a step S13, the map generation unit 12 calculates the position and the posture of the robot based on the odometry. Note that at this point, the position and posture of the robot may be corrected by using a publicly-known technique such as scan matching of range data and a probability estimation technique in order to compensate errors in the odometry.

In a step S14, the map generation unit 12 classifies a plurality of measured points of the range data according to the laser radiating directions. That is, laser radiating directions of the range sensor 11 correspond to measurement directions used to measure an object in the mobile environment by the range sensor 11. Then, the measurement results that are classified according to the laser radiating directions are summarized to generate an occupation ratio map. Note that the occupation ratio map is a grid map created during the generation process of an environmental map. In each grid cell in the occupation ratio map, the number of times a laser beam radiated from the range sensor 11 passes through that grid cell (hereinafter called "laser passage number") and the number of times an object is detected by the range sensor 11 in that grid cell (hereinafter called "wall detection number") are classified and retained according to the laser radiating directions.

Figure 4:
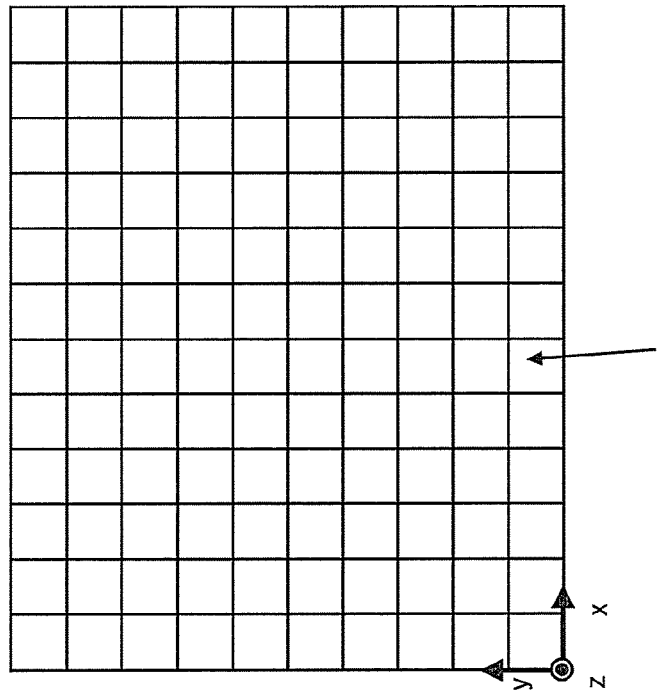
FIG. 4 shows an example of an occupation ratio map.

FIG. 4 shows an example of occupation ratio map. In an occupation ratio map 100 shown in FIG. 4, the radiation directions of laser beams, i.e., the measurement directions used by the range sensor 11 are divided into four groups at 90 degree intervals. Specifically, they are divided into a top-to-bottom direction in the map (hereinafter called "−y direction"), a bottom-to-top direction in the map (hereinafter called "+y direction"), a right-to-left direction in the map (hereinafter called "−x direction"), and a left-to-right direction in the map (hereinafter called "+x direction").

Figure 5:
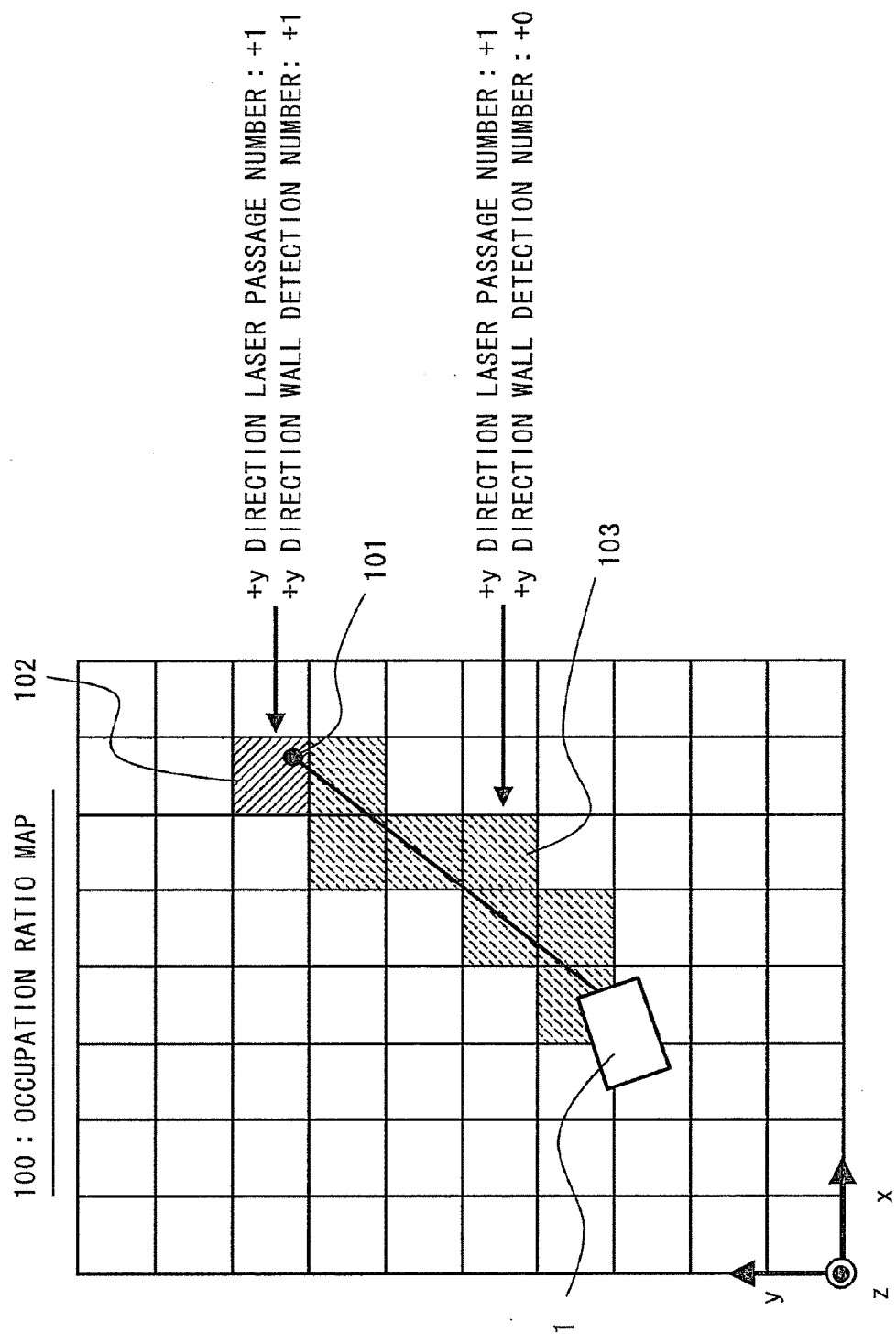
FIG. 5 is a conceptual diagram for illustrating a method of generating an occupation ratio map.

FIG. 5 is a conceptual diagram for illustrating creation procedure of an occupation ratio map 100. The mobile robot 1 drawn in FIG. 5 represents the position and posture of the mobile robot 1 specified based on odometry. Furthermore, a measured point 101 drawn in FIG. 5 represents one of measured points that are obtained by the range sensor 11 and specified based on odometry. In this case, in a grid cell 102 that including the measured point 101, the laser passage number for the +y direction is incremented by one, and the wall detection number for the +y direction is also incremented by one. Meanwhile, in grid cells located on the laser passage path including a grid cell 103, only the laser passage number for the +y direction is incremented by one.

The explanation is continued hereinafter by referring to FIG. 3 again. In a step S15, it is determined whether or not the process has been completed for all of the obtained range data. If it has not been completed, the steps S11 to S14 are repeated.

In a step S16, a wall map is created for each laser radiating direction based on the occupation ratio map. Note that the wall map is a grid map retaining information as a value for each cell, that informs which of "mobile cell", "wall cell" or "unobserved cell" each grid cell is classified into. For example, two-bit values can be used for the information indicating that each cell is belongs to "mobile cell", "wall cell" or "unobserved cell".

Figure 6:
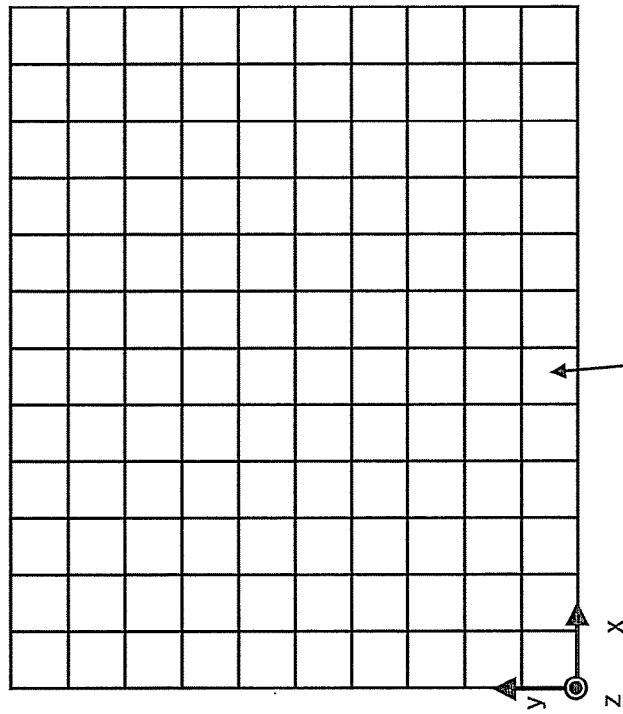
FIG. 6 shows an example of a wall map retaining map data for each measurement direction.

FIG. 6 shows an example of a wall map. A wall map 200 shown in FIG. 6 retains classification values indicating one of "mobile cell", "wall cell" or "unobserved cell" for each of four measurement directions, i.e., +y, −y, −x and +x directions. The decision value for each measurement direction is determined based on a summarized result for a corresponding measurement direction in the occupation ratio map 100. Specifically, the following evaluation value P may be calculated by using the summarized result for each measurement direction in the occupation ratio map 100.

$$P = \text{wall detection number}/(\text{wall detection number} + \text{laser passage number})$$

Then, grid cells for which the evaluation value P is greater than a predefined threshold are defined as "wall cells", grid cells for which the evaluation value P is equal to or less than the predefined threshold are defined as "movable cells", and gird cells for which the laser passage number is zero are defined as "unobserved cells".

Figure 7:
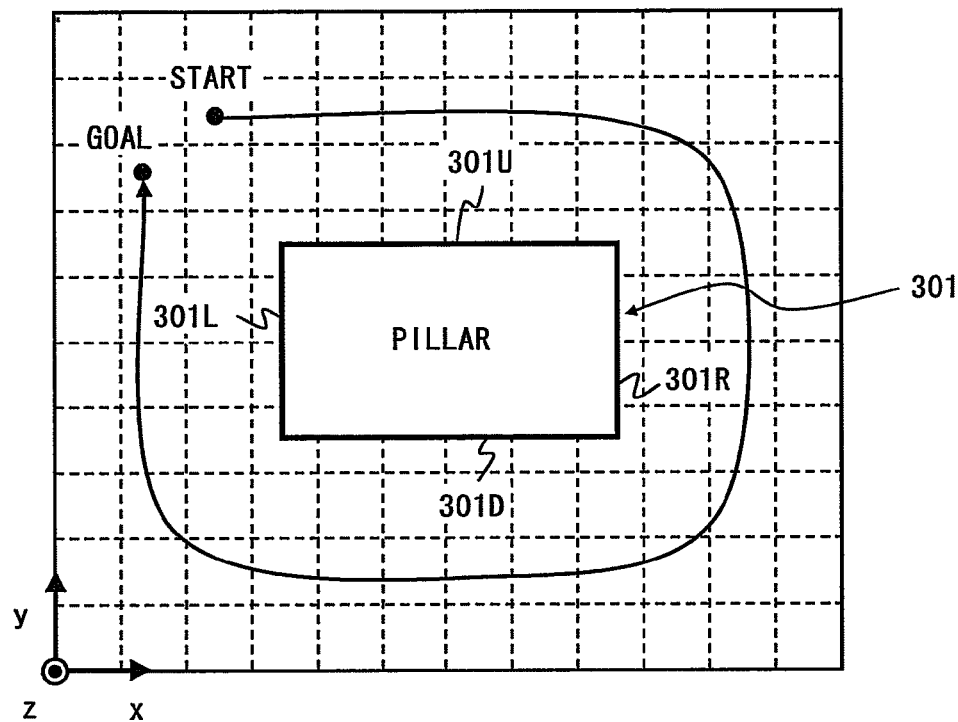
FIG. 7 shows an example of mobile environment.
Figure 8A:
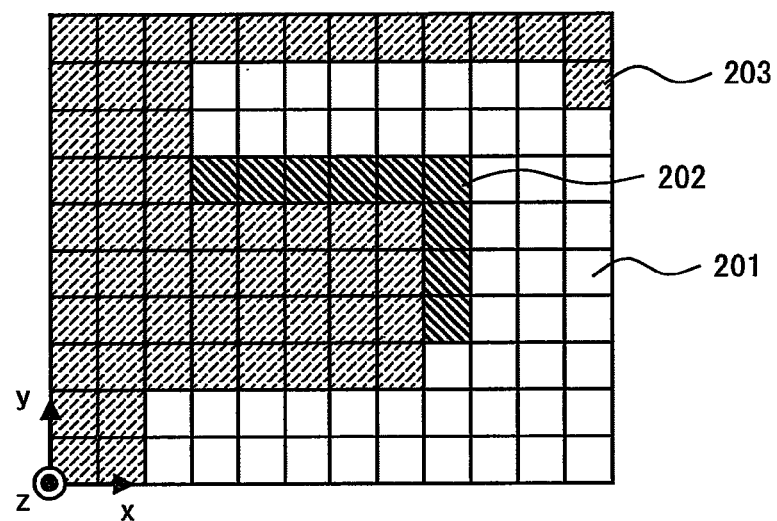
FIG. 8A shows an example of a wall map retaining map data for each measurement direction.

Specific examples of a mobile environment and a wall map corresponding thereto are explained hereinafter. FIG. 7 shows a specific example of a mobile environment. In a central portion of a mobile environment 300 shown in FIG. 7A, a pillar 301 to which the mobile robot 1 cannot move is located. Assume a case where the mobile robot 1 creates a wall map by measuring distances by radiating laser beams from the range sensor 11 within 180 degree range on the forward side of the mobile robot 1 while the mobile robot 1 moves from the start point to the goal point in the mobile environment 300 shown in FIG. 7.

In this case, an upper-side surface 301U of the pillar 301 in the figure is mainly observed by laser beams radiated in the −y direction. Furthermore, since the mobile robot 1 moves from the start point toward the right in the figure, the upper-side surface 301U is also observed by laser beams radiated in the +x direction. Furthermore, a right-side surface 301R of the pillar 301 in the figure is mainly observed by laser beams radiated in the −x direction, and also observed by laser beams radiated in the −y direction. Furthermore, a lower-side surface 301D of the pillar 301 in the figure is mainly observed by laser beams radiated in the +y direction, and also observed by laser beams radiated in the −x direction. Furthermore, a left-side surface 301L of the pillar 301 in the figure is mainly observed by laser beams radiated in the +x direction, and also observed by laser beams radiated in the +y direction.

FIGS. 8A to 8D shows a specific example of a wall map generated in such observation. Four wall maps shown in FIGS. 8A to 8D represent a −y direction wall map 200U, a −x direction wall map 200R, a +y direction wall map 200D, a +X direction wall map 200L respectively. In FIGS. 8A to 8D, outlined grid cells 201 represent "movable cells". Furthermore, hatched grid cells 202 with slanting lines falling toward the right represent "wall cells". Furthermore, hatched grid cells 203 with slanting lines rising toward the right represent "unobserved cells".

It should be noted that there are no specific restrictions on specific data structures for an environmental map having map data corresponding to a plurality of measurement directions. For example, in a case where four map data corresponding to four measurement directions are associated with and retained for a single grid cell, an environmental map may be generated as a combination of four wall maps, in each of which coordinate information to specify the position of a grid cell is associated with one of map data as shown in FIGS. 8A to 8D. Furthermore, as shown in FIG. 6, an environmental map may have a data structure where four map data corresponding to four measurement directions and coordinate information specifying the position of a single grid cell are associated and stored.

The explanation is continued hereinafter by referring to FIG. 3 again. In the final step S17 in FIG. 3, a range map is created for each laser radiating direction based on the wall map generated in the step S16. Note that the range map is a grid map in which information about a distance from the nearest wall cell is retained as a value for each grid cell.

Specific examples of a range map are explained hereinafter with reference to FIGS. 9A and 9B. FIG. 9A shows an environmental map created as a wall map. In FIG. 9A, outlined cells including a cell 410 represent "movable cells" and hatched cells including a cell 411 represent "wall cells".

Meanwhile, FIG. 9B shows an example of a range map converted from the wall map 41 shown in FIG. 9A. The range map 42 shown in FIG. 9B retains a distance from the nearest wall cell as a value for each grid cell. For example, the hatched grid cells in FIG. 9B correspond to wall cells including the cell 411, and therefore the distance from the nearest wall is zero. Therefore, a value retained at a wall cell is zero. Furthermore, cells adjoining these wall cells on anyone of upper, lower, left and right sides retain a value 1. Similarly, other cells also retain a value corresponding to a distance from the center of the cells to the center of the nearest wall cell measured under the condition that the cell pitch (length of a side of a cell) is defined as a unit distance.

By creating a range map like the one shown in FIG. 9B in advance, it is possible to efficiently carry out calculation required to repeatedly obtain distances to the nearest cells when self position estimation is performed (which is explained later). This is because since necessary range values can be obtained by reading values retained in an environmental map, it is possible to eliminate the necessity for carrying out analytic distance calculation every time.

The creation of a range map can be carried out, for example, in the following procedure. A method of creating a range map in which a distance to the nearest wall cell and coordinates of the nearest wall cell are retained in each grid cell is explained hereinafter. Firstly, initial values are set in a range map. Specifically, with regard to wall cells in an environmental map created as a wall map, their own coordinates are set as coordinates of the nearest wall cells and wall distances are set to zero. With regard to cells other than wall cells, e.g., "movable cells" and "unobserved cells" and the likes, coordinates of sufficiently distant cells are set as initial values for coordinates of wall cells and wall distances are set to predefined maximum values.

Figure 10:
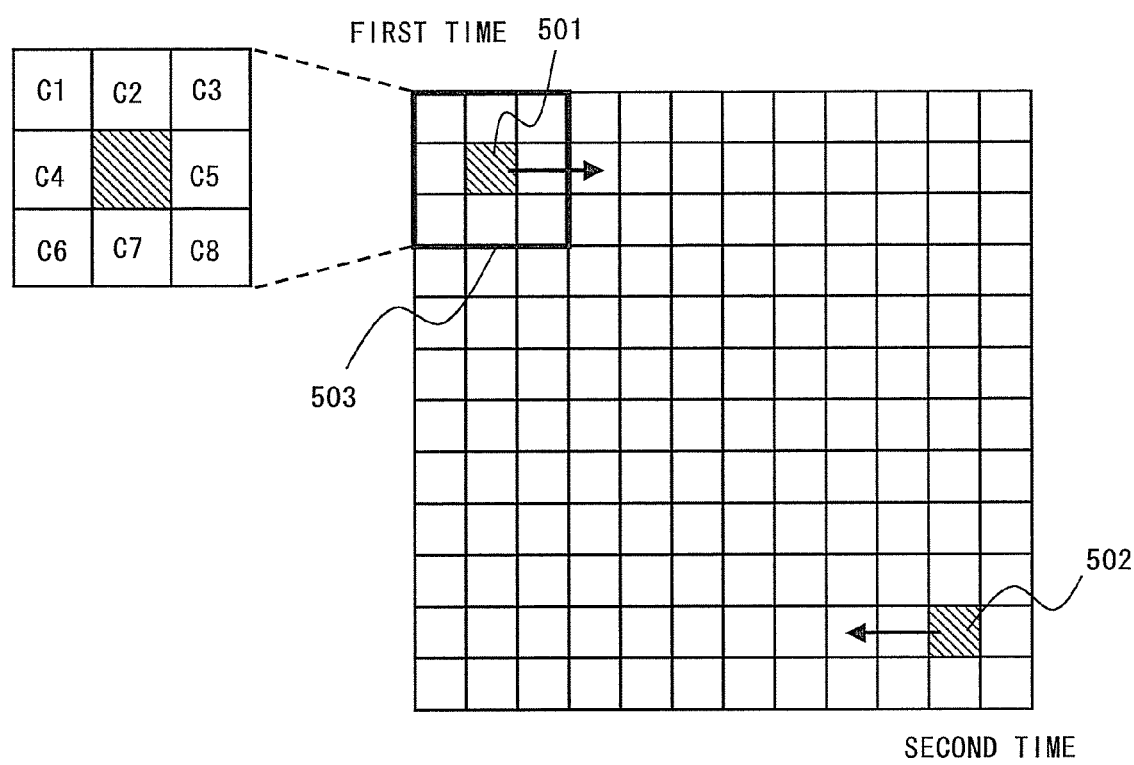
FIG. 10 is a conceptual diagram for illustrating procedure for generating a range map.

Next, as shown in FIG. 10, scanning of the cells is carried out one by one from a grid cell other than the outermost grid cells in the environmental map created as a wall map, e.g., a grid cell 501 toward the right. In each grid cell that is scanned in succession, a distance from the currently scanned cell to the nearest wall cell is calculated by using coordinates of the nearest wall cells (xw, yw) retained at the eight adjoining grid cells. For example, in the case of the grid cell 501, grid cells C1 to C8 enclosed by a square 503 becomes subjects for the calculation. As a result of the calculation for a distance to the nearest wall cell using the values retained at these eight adjoining cells, the minimum distance and the coordinates of the wall cell that provides that minimum distance are associated with and stored for the currently scanned cell. Scanning of grid cells like this is performed one by one from the upper-left cell to the lower-right cell, and then scanning is performed in inverse order from the lower-right grid cell 502 to the upper-left grid cell 501. With procedure like this, a range map can be generated based on the environmental map created as a wall map.

Figure 11:
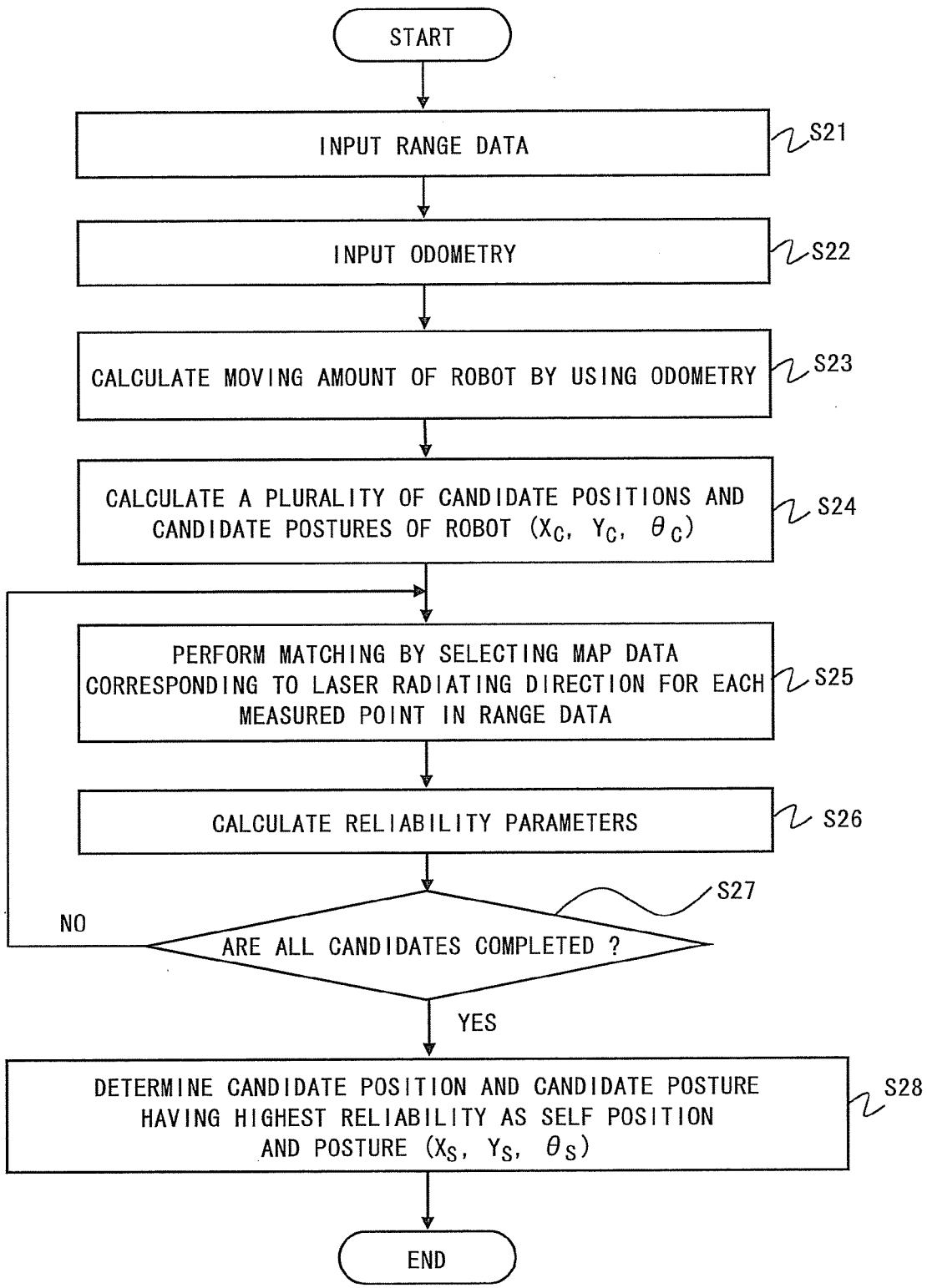
FIG. 11 is a flowchart showing an example of self position estimation procedure.

Next, specific procedure for self position estimation using an environmental map having map data for each measurement direction is explained hereinafter in detail. FIG. 11 is a flowchart showing self position estimation procedure by the self position estimation unit 14.

In a step S21, range data obtained by the range sensor 11 is received. In a step S22, odometry information obtained by the encoder 154 is received. In a step S23, the moving amount of the mobile robot 1 is calculated by using the odometry information. In a step S24, a plurality of candidate positions and candidate postures of the robot (XC, YC, θC) are established at and near a point that is obtained by adding the moving amount obtained in the step S23 to the previously obtained self position.

In steps S25 and S26, matching with the environmental map is performed one by one for each of the plurality of candidate positions and candidate postures of the robot in order to calculate reliability parameters. Specifically, in the step S25, matching is performed by selecting map data corresponding to a laser radiating direction for each measured point in the range data.

Figure 12A:
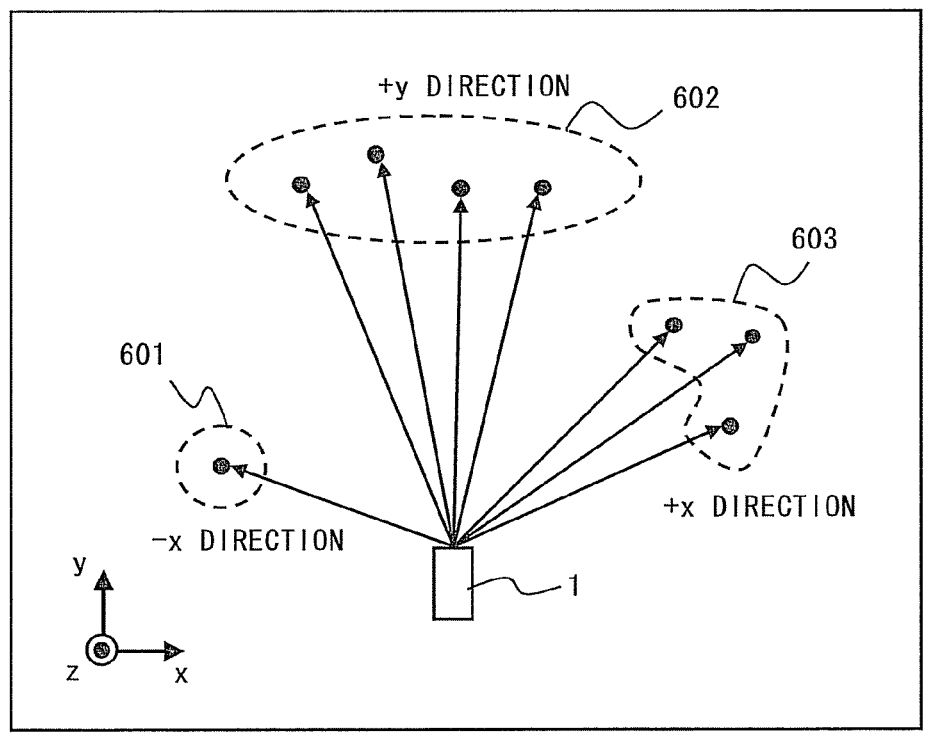
FIG. 12A is a conceptual diagram for illustrating self position estimation procedure.

A specific example of the map data selection in the step S25 is explained hereinafter with reference to FIGS. 12A and 12B. When the mobile robot 1 is located in a mobile environment 600 as shown in FIG. 12A, a measured point group 601 that is obtained by laser beams radiated from the mobile robot 1 in the left direction is compared with a −x direction map data. Furthermore, a measured point group 602 that is obtained by laser beams radiated from the mobile robot 1 in the forward direction is compared with a +y direction map data. Furthermore, a measured point group 603 that is obtained by laser beams radiated from the mobile robot 1 in the right direction is compared with a +x direction map data.

Figure 12B:
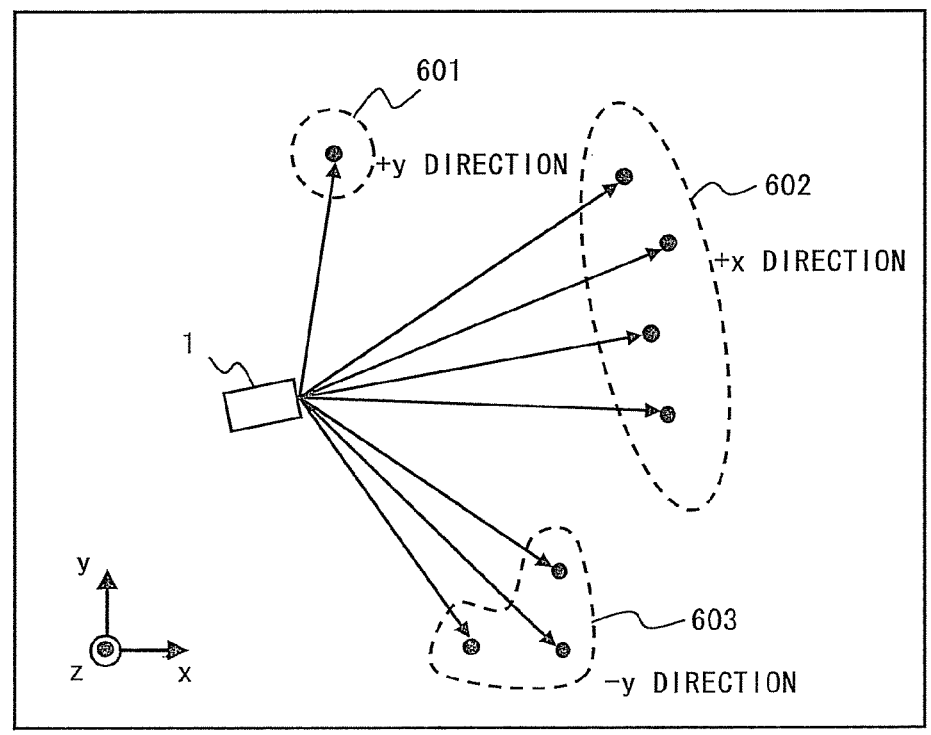
FIG. 12B is a conceptual diagram for illustrating self position estimation procedure.
Figure 13A:
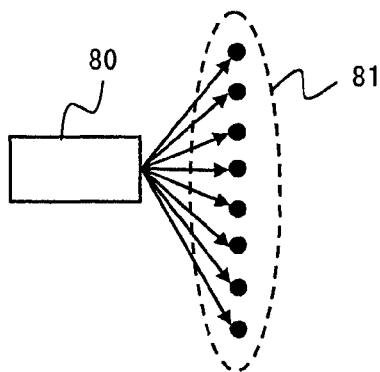
FIG. 13A is a figure for illustrating a problem from which an environmental map in the related art suffers.
Figure 13B:
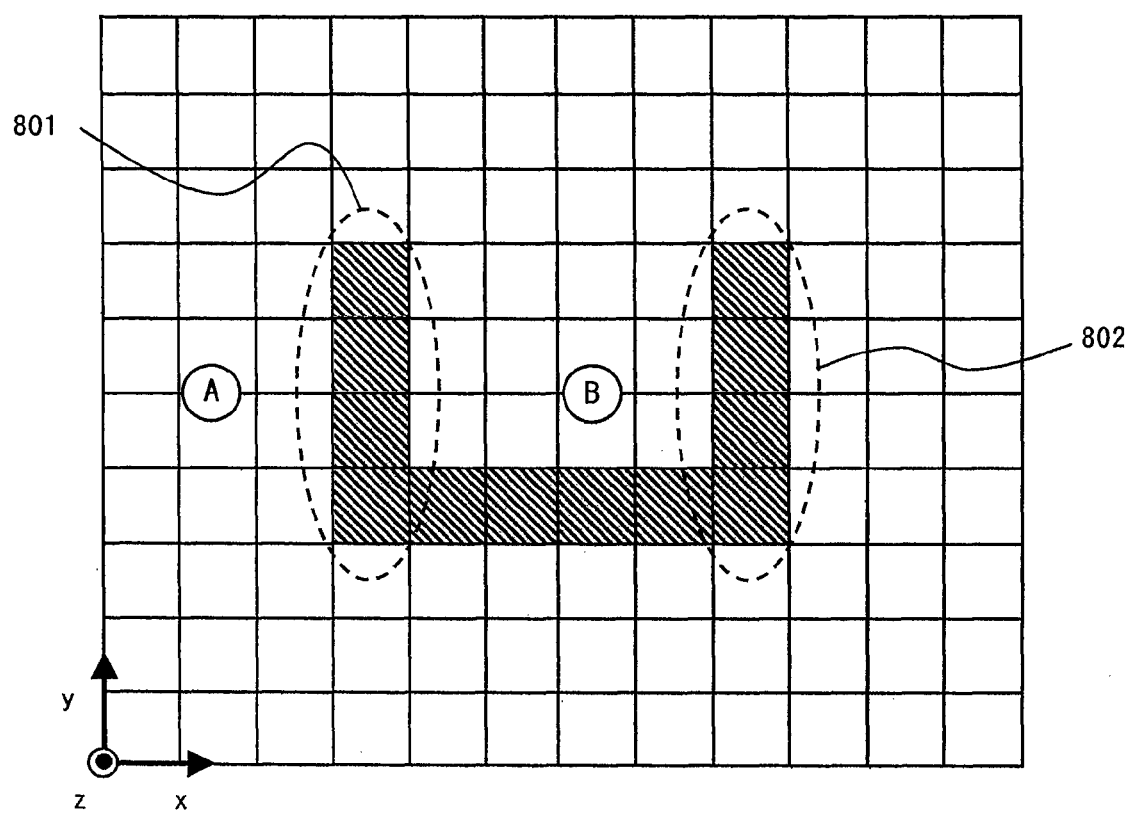
FIG. 13B is a figure for illustrating a problem from which an environmental map in the related art suffers.

Meanwhile, as shown in FIG. 12B, when the mobile robot 1 is located in the mobile environment 600 in a posture that is rotated by 90 degrees in comparison with that in FIG. 12A, the map data to be compared with the measured point is changed. That is, the measured point group 601 that is obtained by laser beams radiated from the mobile robot 1 in the left direction is compared with a +y direction map data. Furthermore, a measured point group 602 that is obtained by laser beams radiated from the mobile robot 1 in the forward direction is compared with a +x direction map data. Furthermore, a measured point group 603 that is obtained by laser beams radiated from the mobile robot 1 in the right direction is compared with a −y direction map data.

The reliability parameters calculated in the step S26 in FIG. 11 may be a total amount obtained by summing up "distances from the nearest wall cells" retained in grid cells in the range map corresponding to the positions of a plurality of measured points obtained by the range sensor 11. In such a case, the smaller the total amount of distances from the nearest wall cells is, the higher the matching degree between the range data and the environmental map becomes, and therefore it means the higher reliability.

In a step S27, it is determined whether or not the calculation of the reliability parameters has completed for all the plurality of candidate positions and candidate postures. If the calculation has not completed, the above-described steps S25 and S26 are repeated.

In a step S28, a candidate position and candidate posture having the highest reliability among the plurality of candidate positions and candidate postures, in other words, a candidate position and candidate posture having the lowest "total amount of distances from the nearest wall cells" as a reliability parameter are determined as the self position and posture of the mobile robot 1 (XS, YS, θS).

As described above, the mobile robot 1 in accordance with this exemplary embodiment of the present invention uses an environmental map in which a plurality of map data each corresponding to a respective one of the measurement directions are associated with and stored for the respective points in a mobile environment when the mobile robot 1 performs self position estimation. Then, the mobile robot 1 uses different map data for matching with range data obtained by the range sensor 11 according to the measurement direction in which measurement is carried out by the range sensor 11. In this way, self position estimation can be performed by using optimal map data corresponding to the view of the surroundings from the position of the mobile robot.

The above-described generation process for an environmental map by the map generation unit 12 may be implemented by using a semiconductor processing device such as an ASIC and a DSP. The map generation process may be implemented by executing a map generation computer program describing the operation procedure shown in FIG. 3 in a computer such as a microprocessor. Similarly, self position estimation by the self position estimation unit 14 may be also implemented by using a semiconductor processing device such as an ASIC and a DSP. The self position estimation may be implemented by executing a self position estimation computer program describing the operation procedure shown in FIG. 11 in a computer such as a microprocessor.

Such map generation computer programs and self position estimation computer programs can be stored in various types of storage media, and also can be transmitted through communication media. Note that examples of the storage media include a flexible disk, a hard drive, a magnetic disk, a magneto-optical disk, a CD-ROM, a ROM cartridge, a RAM memory cartridge with a backup battery, a flash memory cartridge, and nonvolatile RAM cartridge. Furthermore, examples of the communication media include a cable communication medium such as a telephone line, a radio communication medium such a micro-wave line, and the Internet.

Other Exemplary Embodiments

A first exemplary embodiment of the present invention is explained with the assumption that an environmental map is generated by the mobile robot 1 itself. However, the mobile robot 1 may store an externally-supplied environmental map in the environmental map storage unit 13 and use it for self position estimation.

Furthermore, in a first exemplary embodiment of the present invention, a specific example where measurement directions used by the range sensor 11 are divided into four groups at 90 degree intervals and an environmental map having four map data corresponding to these four measurement directions is generated is explained. However, needless to say, the dividing interval for measurement directions of map data retained in an environmental map is not limited to 90 degrees. Specifically, only requirement for the dividing interval for measurement directions of a map data is to set it at a value larger than the resolution of a measurement angle at which the range sensor 11 carries out horizontal scan. Such setting can prevent the data size of an environmental map from becoming excessively larger. Furthermore, as described above, when an environmental map is to be created by summarizing range measurement results obtained by the range sensor 11, a large number of measured points are contained in each measurement direction angular range, so that a map data for each measurement direction can be generated with high accuracy.

Furthermore, in a first exemplary embodiment of the present invention, an example where a range map is used as an environmental map is explained. However, the mobile robot 1 may perform self position estimation by using a wall map containing information about distances from points to the nearest obstacles in the mobile environment, instead of using the range map. Furthermore, the mobile robot 1 may use other maps such as a map in which a height of each point from the floor surface in the mobile environment is stored, instead of or in addition to the above-described wall map and range map, as an environmental map. Furthermore, a first exemplary embodiment is explained with an assumption that the environmental map is a 2D grid map. However, the environmental map may be, for example, a 3D (three-dimensional) grid map.

Furthermore, the present invention is not limited to the above-described exemplary embodiments, and various modifications are possible within the limits without departing from the spirit of the present invention described above.

INDUSTRIAL APPLICABILITY

The present invention can be applied to autonomous mobile robots, in particular self position estimation techniques and environmental map generation techniques for autonomous mobile robots.

The invention claimed is:

1. A mobile robot comprising:
a range sensor that measures a distance to a measured point of an object in a mobile environment;
an environmental map storage unit that stores an environmental map containing a plurality of maps in regard to the measured point, each of the plurality of maps corresponding to a respective one of a plurality of measurement directions of the range sensor and being obtained based on a measurement result obtained by observing the measured point in the mobile environment from a respective one of the plurality of measurement directions of the range sensor; and
a self position estimation unit that selects a map from the plurality of maps corresponding to a measurement direction in which the object is measured by the range sensor, and estimates a self position of the mobile robot based on the selected map and range information of the object obtained by the range sensor;
wherein the self position estimation unit estimates the self position by classifying the plurality of measured points into one of the plurality of the measurement directions based on a measurement direction of the range sensor in which the object is measured by the range sensor and a candidate self position calculated by using odometry and by comparing the range information of each of the plurality of measured points with the plurality of maps for the classified measurement direction of the range sensor, and
wherein the environmental map includes a plurality of map data with regard to a measured point in the mobile environment, each of the plurality of map data corresponding to a respective one of a plurality of measurement directions and being obtained based on a measurement result obtained by observing the measured point in measurement directions, the measurement directions including a top-to-bottom direction in the map ("−y direction"), a bottom-to-top direction in the map ("+y direction"), a right-to-left direction in the map ("−x direction"), and a left-to-right direction in the map ("+x direction").

2. The mobile robot according to claim 1, wherein angular intervals of the measurement directions of the range sensor for classifying the plurality of maps is set to be larger than resolution of a measurement angle of the range sensor.

3. The mobile robot according to claim 1, wherein:
the range sensor is a laser range finder that obtains range information of a plurality of measured points by scanning with a laser beam; and
the self position estimation unit classifies each of the plurality of measured points into one of the plurality of the measurement directions of the range sensor based on a radiating direction of the laser beam and a candidate self position calculated by using odometry, and estimates the self position by comparing the range information of each of the plurality of measured points with the plurality of maps corresponding to a classified measurement direction of the range sensor.

4. The mobile robot according to claim 1, wherein the plurality of maps includes at least one of information indicating whether or not the mobile robot can move through the point, information indicating a distance from the point to a nearest obstacle, and information indicating a height of the point.

5. A method of estimating a self position of a mobile robot that moves in mobile environment, the method comprising:
measuring a distance to an object in the mobile environment with a range sensor and obtaining range information of a plurality of measured points;
referring to an environmental map storage unit containing a plurality of maps in regard to the measured point, each of the plurality of maps corresponding to a respective one of a plurality of measurement directions of the range sensor and being obtained based on a measurement result obtained by observing the measured point in the mobile environment from a respective one of the plurality of measurement directions of the range sensor; and estimating the self position of the mobile robot with a self-position estimating unit by classifying the plurality of measured points into one of the plurality of the measurement directions based on a measurement direction of the range sensor in which the object is measured and a candidate self position calculated by using odometry, and by comparing the range information of each of the plurality of measured points with the plurality of maps for the classified measurement direction of the range sensor, wherein the environmental map includes a plurality of map data with regard to a measured point in the mobile environment, each of the plurality of map data corresponding to a respective one of a plurality of measurement directions and being obtained based on a measurement result obtained by observing the measured point in measurement directions, the measurement directions including a top-to-bottom direction in the map ("−y direction"), a bottom-to-top direction in the map ("+y direction"), a right-to-left direction in the map ("−x direction"), and a left-to-right direction in the map ("+x direction").

6. The method of estimating a self position according to claim 5, wherein angular intervals of the measurement directions of the range sensor for classifying the plurality of maps is set to be larger than resolution of a measurement angle of the range sensor.

* * * * *